United States Patent [19]
Southerland, Jr.

[11] Patent Number: 5,209,007
[45] Date of Patent: May 11, 1993

[54] REMOVABLE EYES FOR FISHING LURES

[76] Inventor: Jack G. Southerland, Jr., 9063 Avalon Dr., Shreveport, La. 71118

[21] Appl. No.: 750,811

[22] Filed: Aug. 27, 1991

[51] Int. Cl.$^5$ .............................................. A01K 85/00
[52] U.S. Cl. .................................................... 43/42.09
[58] Field of Search ............... 43/42.32, 42.09, 42.33, 43/42.34, 42.11, 42.24

[56] References Cited

U.S. PATENT DOCUMENTS

| Re. 13,828 | 11/1914 | Lambert | 43/42.34 |
|---|---|---|---|
| 1,568,325 | 1/1926 | Dewey | 43/42.34 |
| 1,847,397 | 3/1932 | Hofschneider | 43/42.34 |
| 1,993,868 | 3/1935 | Thornberg | 43/42.34 |
| 2,192,563 | 3/1940 | Starkey | 43/42.34 |
| 2,251,593 | 8/1941 | Mangle | 43/42.34 |
| 2,317,781 | 4/1943 | Lehto | 43/42.28 |
| 2,477,460 | 7/1949 | Larson | 43/42.34 |
| 2,502,562 | 4/1950 | Fike | 43/42.32 |
| 2,758,408 | 8/1966 | Murphy et al. | 43/42.34 |
| 2,765,571 | 10/1966 | Sinclair | 43/42.34 |
| 2,765,572 | 10/1956 | Woolfe | 43/42.34 |
| 2,778,144 | 1/1957 | Jones | 43/42.34 |
| 2,837,859 | 6/1958 | Noyal | 42/42.33 |
| 2,957,265 | 10/1960 | Hunt | 43/42.32 |
| 2,994,151 | 8/1961 | Webb | 43/42.34 |
| 3,771,164 | 11/1969 | Novak | 43/42.09 |
| 4,777,758 | 10/1988 | Phillips | 43/42.09 |
| 4,785,569 | 11/1988 | Thomas, Jr. | 43/42.24 |

Primary Examiner—Richard K. Seidel
Assistant Examiner—James Miner
Attorney, Agent, or Firm—John M. Harrison

[57] ABSTRACT

Removable eyes for fishing lures, and soft plastic fishing lures in particular, which removable eyes include in a first preferred embodiment, simulated eyes of selected size, shape and color, each fitted with an elongated shank adapted for insertion in the resilient plastic body of a flexible fishing lure such as a simulated worm, lizard or crawfish. In another preferred embodiment the shank is bent and may be fitted with barbs to resist removal of the removable eyes from the body of the lure.

2 Claims, 1 Drawing Sheet

REMOVABLE EYES FOR FISHING LURES

BACKGROUND OF THE INVENTION

1. Field of the Invention

This invention relates to decorative accessories for fishing lures and more particularly, to removable eyes for resilient plastic lures such as flexible plastic simulated worms, crawfish, lizards and the like. In a first preferred embodiment the removable eyes are characterized by spherical simulated eye members of selected size, shape and color, fitted with an elongated shank for insertion in the body of the fishing lure to simulate eyes on the lure. In another preferred embodiment of the invention the shank is bent or curved and may be provided with rearwardly-extending barbs to retard removal of the shank from the body of the lure when the eyes are positioned in a desired location. The eyes may be constructed of plastic or other moldable material, as well as metal of selected size and shape and in a most preferred embodiment of the invention the eyes are molded from a plastic material and fitted with a shank opening for tightly receiving one end of the barbed or smooth shanks and mounting the shanks in the eyes. Each shank is then inserted in the soft plastic lure at a desired location to facilitate either decorating or enhancing the lifelike appearance of the lure.

In recent years, the sport of fishing has evolved into a multimillion dollar industry, with millions of dollars spent annually on boats, fishing tackle and lures. With the increased interest and emphasis on taking such popular fresh water game fish as black bass, crappie and the like, came a rapid expansion in the development and marketing of improved fishing tackle and new baits and lures in particular. Perhaps the most effective of all artificial lures, particularly in taking black bass, is the popular flexible, resilient plastic lure which is characterized by a molded body that simulates creatures such as worms, crawfish, lizards and the like, wherein a hook may be inserted through the plastic body in multiple configurations to assemble the lures for fishing. The development of such plastic lures, which closely resemble lifelike creatures, along with the development of modern lead molding and injection-molding techniques for creating jigheads and similar accessory articles, has resulted in remarkable innovation in the fishing industry. The creation of such new lures and auxiliary tackle for using them, which tackle includes light action, sensitive rods and high strength monofilament and co-filament line of small diameter, has resulted in a multimillion dollar lure industry. Many of these lures are used with weed guard and hook configurations which vary in design, depending upon the size, weight and category of fish to be taken. The lures may be retrieved using a wide variety of rod actions, depending upon the type of fish sought, the water depth and the weather conditions. These fishing lyres can be further decorated with various types of accessory equipment such as jigheads and the like, to further enhance the realistic appearance of the lures and the attractiveness of the lures to the fish.

2. Description of the Prior Art

The following patents are relevant to the removable eyes for fishing lures of this invention. U.S. Pat. No. Re-issue 13,828, dated Nov. 17, 1914, to R. A. Lambert, entitled "Artificial Fish Bait"; U.S. Pat. No. 1,847,397, dated Mar. 1, 1932, to F. J. Hofscheider, entitled "Trolling Spoon"; U.S. Pat. No. 1,993,868, dated Mar. 12, 1935, to A. E. Thornburg, entitled "Fish Lure"; U.S. Pat. No. 2,192,563, dated Mar. 5, 1940, to H. C. Starkey, entitled "Fishing Lure"; U.S. Pat. No. 2,251,593, dated Aug. 5, 1941, to C. V. Mangle, entitled "Fish Lure"; U.S. Pat. No. 2,317,781, dated Apr. 27, 1943, to V. Lehto, entitled "Fish Lure"; U.S. Pat. No. 2,502,562, dated Apr. 4, 1950, to C. E. Fike, designated "Plug-Type Fishing Lure"; U.S. Pat. No. 2,758,408, dated Aug. 14, 1956, to J. H. Murphy, et al, entitled "Fishing Lures"; U.S. Pat. No. 2,765,571, dated Oct. 9, 1956, to C. C. Sinclair, designated "Fishing Lure"; and U.S. Pat. No. 2,957,265, dated Oct. 25, 1960, to D. E. Hunt, entitled "Fish Lure".

BRIEF DESCRIPTION OF THE DRAWING

The invention will be better understood by reference to the accompanying drawing, wherein.

DESCRIPTION OF THE PREFERRED EMBODIMENTS

Figure 5:
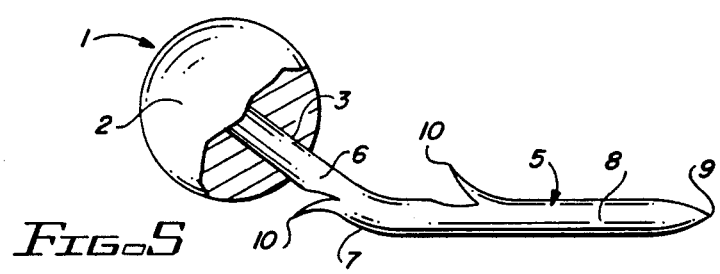
FIG. 5 is a side view, partially in section, of a preferred mounting of a barbed shank in a spherical simulated eye of this invention.
Figure 6:
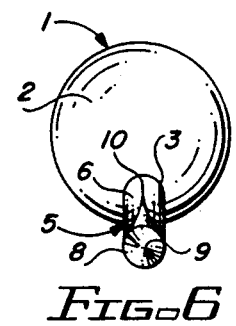
FIG. 6 is a rear view of the removable eye illustrated in FIG. 5.
Figure 7:
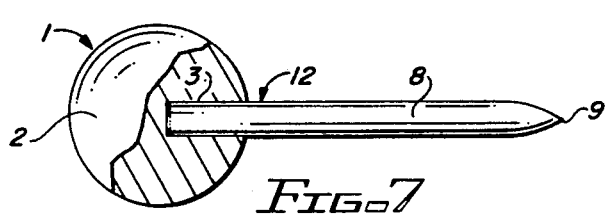
FIG. 7 is a side view, partially in section, of a smooth shank mounted in a spherical simulated eye of this invention.
Figure 8:
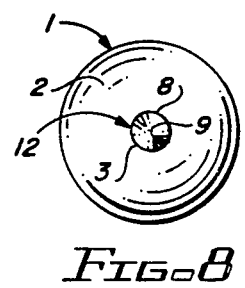
FIG. 8 is a rear view of the removable eye illustrated i FIG. 7.

Referring initially to FIGS. 1, 2, 5 and 6 of the drawing, in a first preferred embodiment of the invention the removable eyes are generally illustrated by reference numeral 1. Each of removable eyes 1 is characterized by a spherical simulated eye 2, provided with a shank bore 3 as illustrated in FIG. 5, for receiving the shank base 6 of a barbed shank 5. In a most preferred embodiment the barbed shank 5 is bent at a shank bend 7 to define the shank base 6 and shank leg 8, as further illustrated in FIGS. 5 and 6 and in another most preferred embodiment of the invention the shank leg 8 terminates in a pointed shank tip 9. Barbs 10 are shaped from the shank base 6 and shank leg 8 of each barbed shank 5 and project outwardly of the surface of the shank base 6 and shank leg 8 toward each simulated eye 2, as further illustrated in FIG. 5. Accordingly, referring again to FIG. 2 of the drawing, it will be appreciated that when each barbed shank 5 is inserted in the head 16 of a crawfish lure 14 having an elongated body 15, the barbs 10 serve to retain the curved barb shank 5 securely in the head 16, with the corresponding simulated eye 2 slightly recessed in the soft flexible plastic of the crawfish lure head 16. This positioning of each barbed shank 5 and corresponding simulated eye 2 in spaced relationship in the crawfish lure 14 presents a lifelike appearance to the crawfish lure 14 and enhances the likelihood of fish striking the crawfish lure 14. The crawfish lure 14 is further characterized by a crawfish lure tail 17, which extends from the crawfish lure body 15, and claws 18, as well as feelers 19, as further illustrated in FIG. 1.

Figure 1:
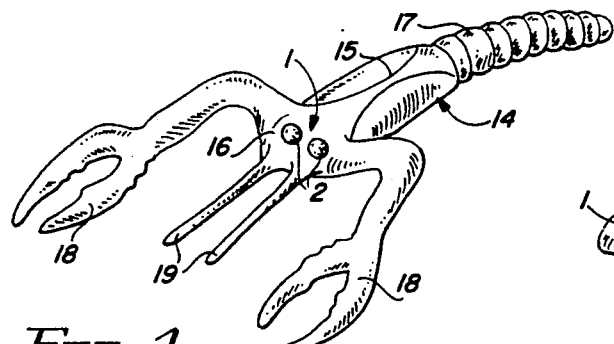
FIG. 1 is a perspective view of a crawfish-shaped flexible plastic fishing lure with a preferred embodiment of the removable eyes of this invention mounted therein.
Figure 3:
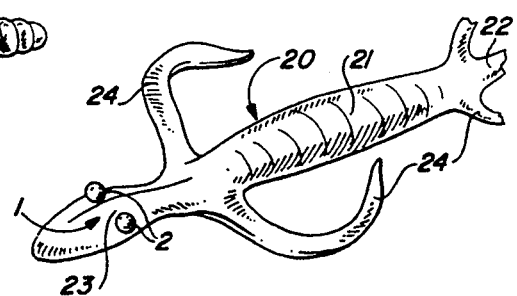
FIG. 3 is a perspective view, partially in section, of a flexible plastic lizard-shaped fishing lure provided with a second preferred embodiment of the removable eyes of this invention.
Figure 2:
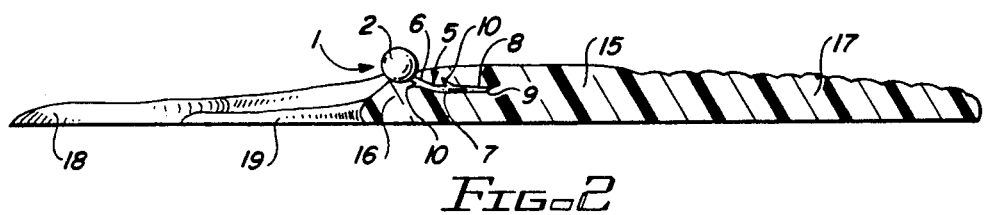
FIG. 2 is a side sectional view of the crawfish lure illustrated in FIG. 1, more particularly illustrating a barbed shank mounting simulated eyes on the lure.
Figure 4:
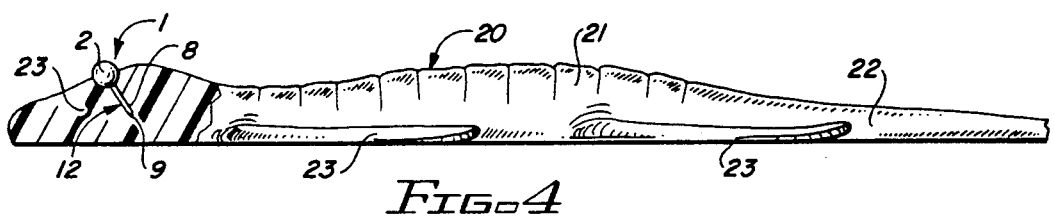
FIG. 4 is a side view, partially in section, of the lizard-shaped lure illustrated in FIG. 3, more particularly illustrating a straight, smooth shank mounting of the removable eyes of this invention.

Referring now to FIGS. 3, 4, 7 and 8 of the drawings, in another preferred embodiment of the invention an alternative design of the removable eyes 1 is mounted in a lizard lure 20, having an elongated lizard lure body 21 legs 24, a lizard lure tail 22, terminating the lizard lure body 22 at one end and a lizard lure head 23 terminating the lizard lure body at the opposite end As in the case of the crawfish lure 14, the lizard lure 20 is typically injection-molded of a flexible plastic material which simulates a live lizard, not only in appearance, but also in resilient consistency. In the case of the lizard lure 20, one end of an elongated, smooth shank 12 is tightly inserted in a shank bore 3 provided in each simulated eye 2 of the removable eyes 1 and the opposite end of the smooth shank 12 terminates in a sharp shank tip 9, as in the case of the barbed shank 5. Accordingly, it will be appreciated from a consideration of FIG. 4 of the drawing that each smooth shank 12 can be inserted into the lizard lure head 23 of the lizard lure 20 with the corresponding simulated eye 2 slightly depressed into the soft flexible plastic of the lizard lure head 23 to simulate the authentic eyes of the lizard lure 20, as illustrated in FIG. 3. Since the lizard lure head 23 is slightly thicker than the crawfish lure head 16 of the crawfish lure 14, the shank legs 8 of the smooth shanks 12 may be straight instead of curved or bent, as in the case of the barbed shanks 5.

Referring again to the drawing, it will be appreciated by those skilled in the art that although a pair of bent barbed shanks 5 are inserted in the crawfish lure head 16 of the crawfish lure 14 and the smooth shanks 12 in the lizard lure head 23 of the lizard lure 20, these embodiments may be reversed and each barbed shank 5 inserted in the lizard lure head 23 of the lizard lure 20, while the smooth shanks 12 are inserted in the crawfish lure head 16 of the crawfish lure 14. Furthermore, the respective barbed shanks 5 and smooth shanks 12 may be inserted in the respective lures in mixed sets, if so desired. In general, however, it is preferred to use the barbed shanks 5 and more particularly, bent barbed shanks 5 which are each characterized by a shank base 6 and a shank bend 7, for insertion in the flexible plastic fishing lures, regardless of design or appearance, since the barbs 10 in the shank base 6 and shank leg 8 of each barb shank 5 serve to provide additional impediments to removal of the barbed shank 5 and hence, the corresponding simulated eye 2 connected to each barbed shank 5, from the plastic fishing lure. Each barbed shank 5 having a shank bend 7 is particularly applicable to those plastic fishing lures which may be thin at the head area and require a more longitudinal insertion of the barbed shank 5, as illustrated with respect to the crawfish lure 14 in FIG. 2, rather than a more downwardly insertion of the removable eyes 1, as illustrated with respect to the lizard lure 20. It will be further appreciated by those skilled in the art that both the barbed shanks 5 and the smooth shanks 12 may be constructed of substantially any length and under circumstances where barb shanks 5 are used, substantially any number of barbs 10 may be provided in each shank base 6 and shank leg 8, as desired. It will also be appreciated by those skilled in the art that the shank leg 8 of each smooth shank 12 may also be provided with a shank bend 7, as in the case of the barbed shank 5 illustrated in FIG. 5, depending again upon the thickness of the head portion of the plastic lure under consideration.

It will be further appreciated by those skilled in the art that while the simulated eyes 2 of the two removable eyes 1 provided in both the crawfish lure head 16 and the lizard lure head 23 are spherical, any desired shape and size may be chosen for the simulated eyes 2 and that shape molded into plastic simulated eyes 2 of selected color or colors, according to the knowledge of those skilled in the art. Moreover, while it is also preferred to manufacture the simulated eyes 2 with a shank bore 3 for insertion of the shank base 6 or shank leg 8, any alternative desired mode of connecting the respective shank base 6 or shank leg 8 to the corresponding simulated eye 2 may be used, again according to the knowledge of those skilled in the art.

In still another preferred embodiment of the invention, the simulated eye 2 element of the removable eyes 1 may also be painted or molded with a desired color or colors, depending upon the color of the flexible plastic lure. Accordingly, colors such as red, blue, yellow and the like, in non-exclusive particular, may be utilized for the simulated eyes 2, as desired, depending upon the color scheme used in the flexible plastic lure to which the removable eyes 1 are attached. It will be further appreciated that the simulated eyes 2 may be of substantially any size which is commensurate with the size of the flexible plastic lure to which it is attached, in order to maintain the realistic, lifelike appearance of the lure.

It is further understood by those skilled in the art that the removable eyes 1 may be used to decorate flexible plastic fishing lures in areas other than the eye area, as desired. For example, multiple removable eyes 1 may be placed along the back of the lizard lure body 21 in spaced relationship to simulate projections from the back area, and the simulated eye 2 element may either be spherical, wedge-shaped or shaped in any other desired configuration, to emphasize the anatomical features of the lizard lure 20.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. The combination of removable and flexible plastic fishing lures, said combination comprising simulated eyes of selected size and shape and an elongated barbed shank carried by each of said simulated eyes, respectively, for insertion int he head of the flexible fishing lures and securing said simulated eyes to the head of the flexible plastic fishing lures in spaced relationship, said barbed shank including a shank bend, said bend defining a shank base and a shank leg, and said simulated eyes carried on said shank base.

2. The combination of claim 1 wherein each of said simulated eyes further comprises a sphere and further comprising a shank opening provided in said sphere, said shank opening receiving one end of said elongated barbed shank is fixed relationship, respectively.

* * * * *